Figure 1:
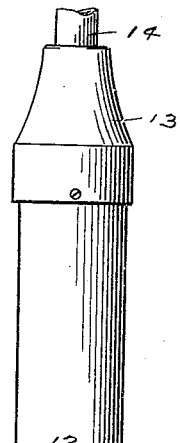

E. J. WELDON.
COMBINED FISHPOLE HANDLE AND WEIGHING SCALE.
APPLICATION FILED MAY 4, 1909.

952,552.

Patented Mar. 22, 1910.

WITNESSES:
H. A. Lamb
S. W. Atherton

INVENTOR
Edwin J. Weldon
BY
A. M. Wooster
ATTORNEY

UNITED STATES PATENT OFFICE.

EDWIN J. WELDON, OF TORRINGTON, CONNECTICUT.

COMBINED FISHPOLE-HANDLE AND WEIGHING-SCALE.

952,552.  Specification of Letters Patent.  Patented Mar. 22, 1910.

Application filed May 4, 1909. Serial No. 493,928.

*To all whom it may concern:*

Be it known that I, EDWIN J. WELDON, a citizen of the United States, residing at Torrington, county of Litchfield, State of Connecticut, have invented an Improvement in Combined Fishpole-Handles and Weighing-Scales, of which the following is a specification.

This invention has for its object to provide a combined fish pole handle and weighing scale which shall be simple and inexpensive to produce, adding but slightly to the cost of the pole, which will require the shortest possible length of recess for inclosing the scale in the handle so as to not weaken the upper end of the handle and which shall be so constructed that the scale is wholly concealed when not in use and effectually protected against hard usage and against moisture so that the scale will be durable and will remain accurate for an almost unlimited length of time and will provide the fisherman with means for ascertaining the weight of his catch while out fishing or in camp and without the inconvenience of carrying extra scales not especially adapted for the purpose.

With these and other objects in view I have devised the novel structure which I will now describe, referring to the accompanying drawing forming a part of this specification and using reference characters to indicate the several parts.

Figure 2:
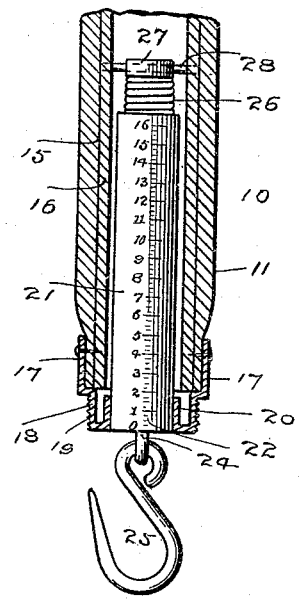
Figure 2:
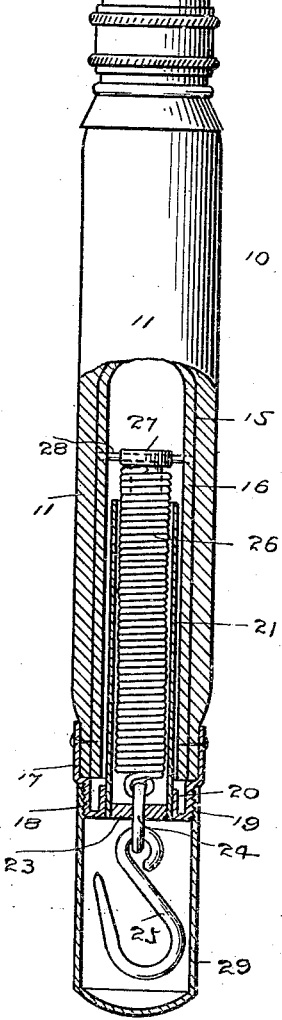
Figure 3:
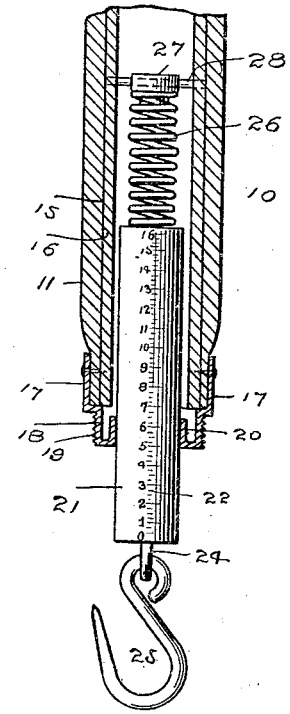

Figure 1 is an elevation of the butt or handle of a fish pole, partly in section to show the construction of the scale, the cap being in place as when the scale is not in use; Fig. 2 a sectional view with the cap removed; and Fig. 3 is a sectional view illustrating the operation of weighing.

10 denotes the handle of a fish pole as a whole and 11 the grip which may be made of cork, wood, hard rubber, vulcanized fiber, or any suitable material, and which is rigidly secured to a metal portion specifically indicated by 12. At the upper end of the metal portion is a socket 13 which receives the first joint of the pole, indicated by 14. The grip is provided with a longitudinal recess 15 open at its lower end in which a sleeve 16 of wood, metal, vulcanized fiber or any suitable material is rigidly secured in any suitable manner, but so as to be conveniently removable if required. At the lower end of the grip is a collar 17 rigidly secured thereto and having a reduced portion 18 which is externally screw-threaded as at 19 and is provided with an internal hub 20.

In practice the sleeve is formed from sheet metal and the hub is formed by turning the metal inward and forms a bearing for the barrel of the scale. The scale is carried by the sleeve and is removable with it. The scale comprises a tubular barrel 21 having marked thereon an index scale 22 graduated in pounds, halves and quarters. The barrel has rigidly secured at its lower end a disk 23 in which is secured a double eye 24. The outer end of the eye carries a hook 25 and the spring 26 is secured to the inner end thereof. The spring is inclosed by and extends upward through and above the barrel and is secured to a hub 27 which in turn is secured to the sleeve as by a cross-pin 28, at a point only slightly above the normal position of the inner end of the barrel 21. The lower end of the barrel normally registers with the lower face of hub 20, as in Figs. 1 and 2. When a fish or anything it is desired to weigh is placed upon the hook, the barrel is drawn outward against the power of the spring and the index scale in connection with the lower face of hub 20 correctly indicates the weight of the object carried by the hook, as in Fig. 3. As the collar 17 is rigidly secured to the grip, its end or the lower face of the hub 20, can not get out of position for accurate coaction with the scale on the barrel 21. When not in use, the hook is covered by a cap 29, the outer end of which is internally threaded to engage the thread 19 on the reduced portion of the sleeve, as in Fig. 1. This cap in addition to forming the finish for the butt or handle of the pole covers the hook and effectually protects the scale against the entrance of moisture.

As shown, the spring 26 is of the expansion type and is almost entirely contained in the tubular barrel 21 when in normal position. The length of the device is therefore reduced to the minimum and consequently the recess 15 need not be greater than that portion of the handle which is grasped by the hand. A spring of the compression type located beyond the inner end of the scale barrel would necessitate making the recess 15 of such length as would weaken the pole beyond the grasping point. A further advantage is that the diameter of the barrel and of the hole in hub 20 which guides the barrel is sufficiently less than the internal diameter of sleeve 16 to prevent any possibility of frictional binding of the barrel in the sleeve. Hence the sleeve may be of wood or fiber which, as is well known, is liable to be affected by dampness.

Having thus described my invention I claim:

1. A fish pole handle having a longitudinal recess, a sleeve fixed in said recess, a tubular barrel having an index scale and mounted in said recess, a bearing for said barrel at the end of the handle, the diameter of the bearing and the barrel being less than the internal diameter of the sleeve to form a space between said barrel and sleeve, an expansion spring inclosed by the barrel and having one end connected to the lower end of the barrel, its other end having a connection with the sleeve above the inner end of the barrel, and means for engaging an article to be weighed with the lower end of the barrel.

2. A fish pole handle having a longitudinal recess, a sleeve fixed in said recess, a tubular barrel having an index scale and mounted in said recess, a collar rigidly secured to the lower end of the handle and having a bearing for said barrel, the diameter of the bearing and the barrel being less than the internal diameter of the sleeve to form a space between said barrel and sleeve, an expansion spring inclosed by the barrel and having one end connected to the lower end of the barrel its other end having a connection with the sleeve above the inner end of the barrel, and a hook attached to the lower end of the barrel.

In testimony whereof I affix my signature in presence of two witnesses.

EDWIN J. WELDON.

Witnesses:
FREDERICK E. WELDON,
EDUARD S. PETERSON.